United States Patent
Nosho et al.

(10) Patent No.: US 6,495,189 B1
(45) Date of Patent: Dec. 17, 2002

(54) PROCESS FOR PRODUCING FAT COMPOSITION

(75) Inventors: Yasuharu Nosho, Takasago (JP); Kazuhiro Ueshima, Kobe (JP); Toshinori Ikehara, Takasago (JP); Shinichi Hashimoto, Takasago (JP); Masakazu Kato, Akashi (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/744,941

(22) PCT Filed: Sep. 21, 1999

(86) PCT No.: PCT/JP99/05127

§ 371 (c)(1), (2), (4) Date: Jan. 31, 2001

(87) PCT Pub. No.: WO00/16639

PCT Pub. Date: Mar. 30, 2000

(30) Foreign Application Priority Data

Sep. 22, 1998 (JP) .................................. H10-267499
Sep. 3, 1999 (JP) .................................. H11-249612

(51) Int. Cl.⁷ .................................. A23D 9/00
(52) U.S. Cl. .................. 426/607; 426/524; 117/77; 117/927; 23/295 R; 554/211
(58) Field of Search .................. 426/606, 607, 426/524; 117/77, 927; 23/295 R; 554/211

(56) References Cited

U.S. PATENT DOCUMENTS 4,948,618 A * 8/1990 Hirokawa et al. .......... 426/417
5,470,598 A * 11/1995 Scavone ..................... 426/601

FOREIGN PATENT DOCUMENTS

| JP | 55-7007 | | 1/1980 |
| JP | 4-283297 | * | 4/1982 |
| JP | 61-289838 | | 12/1986 |
| JP | 63-133942 | | 6/1988 |
| JP | 4-283297 A2 | | 10/1992 |

* cited by examiner

*Primary Examiner*—Carolyn Paden
(74) *Attorney, Agent, or Firm*—Armstrong Westerman & Hattori, LLP

(57) ABSTRACT

Disclosed is a method of producing a fat and oil composition comprising the steps of melting a fat and oil, or emulsion comprising fat and oil, and crystallizing the above-mentioned fat and oil by cooling to produce a fat and oil composition in paste form or plastic form. The molten fat and oil, or emulsion comprising fat and oil, is pressurized under force at a pressure of 10 to 150 MPa during the above-mentioned crystallization in the production of fat and oil compositions such as fat and oil processed foods, etc. As a result the crystallization speed of the fat and oil is markedly increased and post-crystallization can be prevented. Thus, improvement in quality of the fat and oil processed food and improved efficiency of the production process in terms of time and energy is achieved.

9 Claims, 8 Drawing Sheets

PROCESS FOR PRODUCING FAT COMPOSITION

BACKGROUND OF THE INVENTION

1. Field of the Invention

The present invention pertains to a method of producing a fat and oil composition in paste form or plastic form by cooling molten fat and oil or an emulsion comprising fat and oil, etc., in order to crystallize the fat and oil, and in further detail, to a method of producing a fat and oil with which it becomes possible to curtail and make efficient the production process when fat and oil processed foods, such as margarine or shortening, are produced.

2. Description of the Related Art

The process of producing fat and oil processed foods such as margarine, shortening, etc., usually involves crystallization, that is, the formation of crystals, of the fat and oil by cooling and kneading a molten fat and oil or emulsion to obtain a product in paste form or plastic form. Closed continuous-type scraped-surface heat exchangers and open chillers are given as the cooling and kneading device that is generally used at this time. Examples of the above-mentioned closed continuous-type scraped-surface heat exchangers are the Kombinator (Schroeder & Co., Germany), Votator (Cherry-Burrell Votator Division, USA)), Perfector (Gersternberg & Agger A/S, Denmark)), Chemetator (Crown Chemtech, Ltd., UK)), etc., and these are generally referred to as A units. Moreover, the Diacooler (Gersternberg & Agger A/S, Denmark)) is an example of the above-mentioned open chiller.

The above-mentioned closed continuous-type scraped-surface heat exchanger (A unit) uniformly kneads while scraping the surface as cooling and crystallization occur from around the molten composition, which has been introduced by a pump and is passing through the tubular heat exchanger unit. Nevertheless, thorough crystallization cannot be accomplished within the short cooling time of this type of cooling and kneading device. As a result, crystallization actually gradually proceeds once the product has been produced. However, this phenomenon of gradual crystallization following production is referred to as post-crystallization, and the crystals that are produced at this time generally become the cause of a marked reduction in the various commercial properties of fat and oil products with large crystal formation readily occurring, the product having a coarse texture, the product readily cracking, poor spreading performance, that is, spreadability, poor whipping performance, etc.

On the other hand, by means of the above-mentioned open chiller, for instance, the fat and oil composition is applied directly to the drum of the Diacooler and rapidly cooled and solidified and the fat and oil that is scraped off in the form of a thin piece is then kneaded under reduced pressure in the Complector (Gersternberg & Agger A/S, Denmark), etc., to obtain the product. Nevertheless, this type of cooling and kneading device is an open device and therefore, there are problems with hygiene. Moreover, the fat and oil that has been rapidly cooled and solidified must be kept in the hopper for several hours or longer for maturation and there is therefore a need to curtail the production time.

There are problems with producing fat and oil processed foods as previously described in that it takes a long time to thoroughly precipitate the crystals when the fat and oil is crystallized and if crystallization is performed in a short amount of time, the quality of the product will deteriorate due to post-crystallization. Various tests have been thus far performed that have involved, for instance, changing the shape or clearance of the heat exchanger unit, using a series of several heat exchanger units, and changing the cooling temperature in order to improve cooling efficiency of closed continuous-type scraped-surface heat exchangers in an attempt to solve the above-mentioned problems. Moreover, attempts have also been made to promote crystallization by placing a holding unit between each cooling unit. Nevertheless, thus far it has not be possible to completely prevent post-crystallization and it usually is impossible to obtain a puff pastry or a sheet shape margarine product, wherein quality is particularly a problem, by using cylindrical units called resting tubes after cooling and kneading, or by gradually kneading as the fat and oil composition is being passed through a resting tube with a varying diameter as needed, because crystallization is not completed up to the point where post-crystallization no longer has a detrimental effect. Efficiency deteriorates over time and a considerable amount of labor is required in order to treat the fat and oil composition remaining in the resting tube when the lines are washed after production is completed, etc., leading to poor yield of the product. On the other hand, problems remain when an open chiller is used in that in addition to the above-mentioned hygiene problem, production takes a considerable amount of time because a maturation process is needed. A sufficient air content is not realized by conventional production processes, particularly with processed fat and oil products for butter cream, due to the effects of post-crystallization of the fat and oil crystals as previously described, and the fat and oil composition must be kept for several ten hours at a temperature that is 2 to 5° C. lower than the melting point of the fat and oil in order to impart a sufficient air content. A maturation process called "tempering" in Japan is generally necessary, and this leads to a large loss in terms of both energy and time.

Thus, although various research and production efforts have been previously made in order to eliminate the detrimental effects of post-crystallization on the various uses of fat and oil processed foods, a solution that is sufficient for realizing efficient crystallization of fats and oils has yet to be found and development of a technology with which crystallization can be completed in a short amount of time during production of fat and oil processed foods in order to eliminate the detrimental effects of post-crystallization is eagerly awaited.

SUMMARY OF THE INVENTION

The above-mentioned various problem points are problems that cannot be avoided simply by crystallization by cooling during the production of fat and oil processed foods. Therefore, the inventors performed intense studies based on the idea that each of the above-mentioned problems can be solved not simply by relying on cooling only for crystallization, but by concomitantly using other methods in order to complete crystallization of the fat and oil composition in a short amount of time, and that actually, it is probably possible to curtail the crystallization time by applying pressure during crystallization, and as a result, they completed the present invention upon discovering that the crystallization starting temperature can be increased and therefore, the crystallization completion time can be markedly curtailed, by force application of pressure by some type of method during cooling and crystallization.

That is, the present invention is a method of producing a fat and oil composition, comprising the steps of melting fat and oil or emulsion comprising fat and oil and cooling this to crystallize the above-mentioned fat and oil and produce a fat and oil composition in paste form or plastic form, with pressure being applied by force to the above-mentioned molten fat and oil or emulsion comprising fat and oil during the above-mentioned crystallization.

By means of a preferred embodiment of the method of producing a fat and oil composition of the present invention, pressure is first applied after the above-mentioned fat and oil or emulsion comprising fat and oil has been pre-cooled to such an extent that crystals of the above-mentioned fat and oil do not precipitate. Moreover, by means of a preferred embodiment, pressure is within a range of 10 to 150 MPa and by means of a preferred embodiment, pressurization time is 1 to 60 minutes. Moreover, it is preferred that the fat and oil be kneaded simultaneously with crystallization of the fat and oil or after crystallization of the fat and oil by the method of the present invention. It is further preferred that the above-mentioned emulsion be a W/O emulsion. The above-mentioned method of producing a fat and oil composition of the present invention is particularly useful for the production of fat and oil processed foods that use edible fats and oils or emulsions containing fats and oils as their starting material.

The fat and oil used in the present invention is an edible fat and oil that is normally used in edible fat and oil food products. Natural oils, such as animal oils, vegetable oils, milk fat, etc., their hardened oils, fractionated oils, interesterificated oils, random interesterificated oil, etc., alone, or their mixed oils are used. They are used as a fat and oil only or as a W/O emulsion that has been emulsified with water. There are no problems with adding flavoring components, fragrance, nutrient component, emulsifiers, gelling agents, antioxidants, etc., that are normally added to fat and oil processed foods to the above-mentioned fat and oil or its emulsion.

One example of an actual method of producing a fat and oil composition by the method of the present invention will be given. First, the above-mentioned edible fat and oil or its emulsion is melted to a temperature at which the above-mentioned fat and oil will completely melt (usually 65° C.). Next, the above-mentioned molten fat and oil or emulsion is introduced to inside a hydrostatic vessel and pressurized. It is possible to simultaneously cool while pressurization is being performed by cooling the hydrostatic medium in the hydrostatic vessel. The pressure device of the above-mentioned hydrostatic vessel can be a system such as a piston system or hydraulic system, but it should not be a pneumatic system in terms of cooling efficiency, pressurization capability, and safety. Moreover, pressurization can be performed by the batch system or the continuous system. Optimum pressure, pressurization time, and temperature of the hydrostatic medium differ with the composition of the starting edible fat and oil that is used, amount of solid fat, melting point, etc., and cannot unconditionally specified, but it is usually preferred that treatment be performed within a range of pressure of 10 to 150 MPa, pressurization time of 1 to 60 minutes, and hydrostatic medium temperature of −30 to 15° C. It is often the case that if the above-mentioned pressurization pressure is less than 10 MPa, crystallization by pressurization will not be sufficiently promoted and will have little effect, and a pressure higher than what is necessary is undesirable, both in terms of economics and safety. The pressurization time is determined giving equal consideration to pressure, temperature, the fat and oil composition, etc., but if it is less than 1 minute, crystallization will usually be insufficient in most cases. There is no deterioration in quality of the fat and oil properties, etc., if pressurization is continued after crystallization has been completed, but there is little further effect and actually, it is not necessary to continue pressurization for more than 60 minutes. If the temperature of the above-mentioned hydrostatic medium is higher than 15° C., cooling speed will be delayed and the crystallization time will be long, even with the effects of pressurization, and it will be difficult to obtain a large improvement. On the other hand, although the cooling speed is fast when the temperature of the hydrostatic medium is under −30° C., pressurization will have little effect in terms of promoting crystallization, and this is also undesirable in terms of economics. In addition, although sufficient results are seen with just one pressurization treatment, there is further improvement when the same treatment is repeated as necessary when crystallization is insufficient, etc.

Furthermore, the term crystallization in the present invention means the formation of crystals whereby the molten fat and oil changes to a solid fat. In addition, the term completion of crystallization means the state where the component that should crystallize at that temperature has completely crystallized. Furthermore the term "kneading" in the present invention means mechanical agitation and kneading of the fat and oil composition.

In addition, by means of the present invention, pressurization can be performed simultaneously with cooling, but it is also possible to start pressurization after pre-cooling the edible fat and oil or its emulsion with a conventional cooling device to such an extent that the crystals have not precipitated. Better properties as an edible processed fat and oil are obtained in this case because since the fat and oil has been pre-cooled, the crystallization starting temperature rises with pressurization and therefore, crystallization will occur in one breath at the time of pressurization and as a result, the crystals that are obtained will be fine crystals. Furthermore, results such as curtailment of the processing time, curtailment of the crystallization time, etc., will also be obtained.

It is preferred that a fat and oil composition such as margarine, shortening, etc., be continuously produced by, for instance, simultaneously kneading with crystallization, in addition to cooling and crystallizing by pressurization, the fat and oil composition or emulsion using a cooling and kneading device such as an extruder with a pressure-resistant structure, or a conventional closed, continuous-type scraped-surface heat exchanger device (A unit) that has a pressure-resistant structure as needed, with the gears being adjusted using a reverse screw, or pressure being adjusted with a gear pump, by tubing diameter being changed, etc., when the above-mentioned extruder is used, or pressure being adjusted with the gear pump or by tubing diameter being changed, etc., when a cooling and kneading device such as the above-mentioned closed continuous-type scraped-surface heat exchanger device (A unit) is used, as a method of industrially producing the fat and oil composition, such as an edible processed fat and oil, of the present invention. The fat and oil composition, such as margarine, shortening, etc., can also be produced by, for instance, continuously feeding pre-melted fat and oil or emulsion to a pressure-resistant vessel with a cooling means and pressurization means, such as a pressure-resistant vessel equipped with a cooling means and a pressurization piston, simultaneously performing cooling by the above-mentioned cooling means and pressurization by the pressurization piston to crystallize the fat and oil, and once crystallization of the fat and oil is completed, kneading the product with a kneading unit, such as a screw kneader, etc., as another method.

For instance, FIG. 1 shows the production process whereby extruder 1, cooling and kneading device (A unit) 2, and kneading device (X unit) 3 are joined by piping 4. Above-mentioned extruder 1 has screw 5 in the front half and reverse screw 6 in the back half and cooling jacket 7 is where said reverse screw 6 is placed. By means of producing the fat and oil composition by the process shown in FIG. 1, when fat and oil starting material, such as edible fat and oil or its emulsion, etc., that has been pre-melted is fed through tubing 4 to extruder 1, the fat and oil starting material that has been fed is sent forward by screw 5, but because screw 6 at the back half of extruder 1 is a reverse screw, the fat and oil starting material is cooled by cooling jacket 7 as pressure is simultaneously applied by force to the fat and oil starting material and as a result, crystallization of the fat and oil takes place. Moreover, kneading by reverse screw 6 is simultaneously performed with this crystallization. Thus, the majority of the molten fat and oil starting material crystallizes inside above-mentioned extruder 1. Then the above-mentioned fat and oil that has been crystallized is sent to A unit 2 and cooled further to complete crystallization. Furthermore, the fat and oil is pressurized by force in this A unit 2. Then it is sent to X unit 3 and further kneaded to obtain the final product. As previously explained, by means of the process shown in FIG. 1, crystallization is performed mainly by extruder 1 and A unit 2 is an auxiliary unit where pressurization under force is not performed and therefore, a cooling and kneading device such as a conventional closed continuous-type scraped-surface heat exchanger device, etc., can be used as is for A unit 2. Moreover, any type of structure can be used for above-mentioned X unit 3 as long as the crystallized fat and oil composition can be kneaded.

Next, FIG. 2 shows the production process whereby several cooling and kneading devices (A1 unit through A3 unit) 11 through 13 and kneading device (B unit) 14 are connected by tubing 17 and gear pumps 15 and 16 for feeding the fat and oil are placed between the units. By means of producing the fat and oil composition by the process in this FIG. 2, the fat and oil starting material, such as the pre-melted edible fat and oil or its emulsion, etc., is first fed to A1 unit 11 and then pre-cooled to such an extent that crystallization of the fat and oil does not occur here. During this pre-cooling, pressurization is not performed under force. Then the fat and oil is fed in succession to A1 unit 12 and A3 unit 13 by gear pump 15 and here it is cooled further. The fat and oil is crystallized at this time by pressurization under force by adjusting gear pumps 15 and 16. Then the fat and oil is sent to B unit 14 and kneaded to obtain the product. Since pressurization under force is not performed by above-mentioned A1 unit 11 in the process shown in FIG. 3, a conventional cooling and kneading device, such as a closed continuous-type scraped-surface heat exchanger device, etc., can be used as is for A1 unit 11. On the other hand, since pressurization under force by gear pumps 15 and 16 is performed in A2 unit 12 and A3 unit 13, it is necessary to use a cooling and kneading device with a pressure-resistant design. Furthermore, if cooling and crystallization by above-mentioned cooling and kneading devices (A1 through A3) 11 through 13 is insufficient, the number of cooling devices can be increased further to an A4 unit and so forth. In addition, any type of structure can be used for kneading device (B unit) 14 as long as the crystallized fat and oil composition can be kneaded. For instance, a conventional kneading device called a pin machine can be used.

Furthermore, FIG. 3 shows the production process whereby kneading and shaping unit 25, such as a screw extruder, etc., is connected by extruder 24 to a plurality of crystallization units 21 through 23 consisting of pressure-resistant vessels equipped with cooling means (not illustrated) and piston 26 for pressurization. Above-mentioned extruder 24 can also be omitted. By means of producing a fat and oil composition by the process shown in FIG. 3, the molten fat and oil starting material, such as edible fat and oil or emulsion, etc., is fed to crystallization units 21 through 23 and pressurized under force by piston 26 as it is being cooled and crystallized. Then it is sent to kneading and forming unit 25 by screw 27 of extruder 24 and here it is kneaded to obtain the product. There are no restrictions to the number of above-mentioned crystallization units 21 through 23, and as shown by the broken curve in the figure, the crystallized fat and oil can be sent directly from crystallization units 21 through 23 to kneading and forming unit 25 by piping, etc., or a gear pump for feeding the fat and oil can be placed somewhere in the tubing, without installing above-mentioned extruder 24.

DESCRIPTION OF THE PREFERRED EMBODIMENTS

Figure 1:
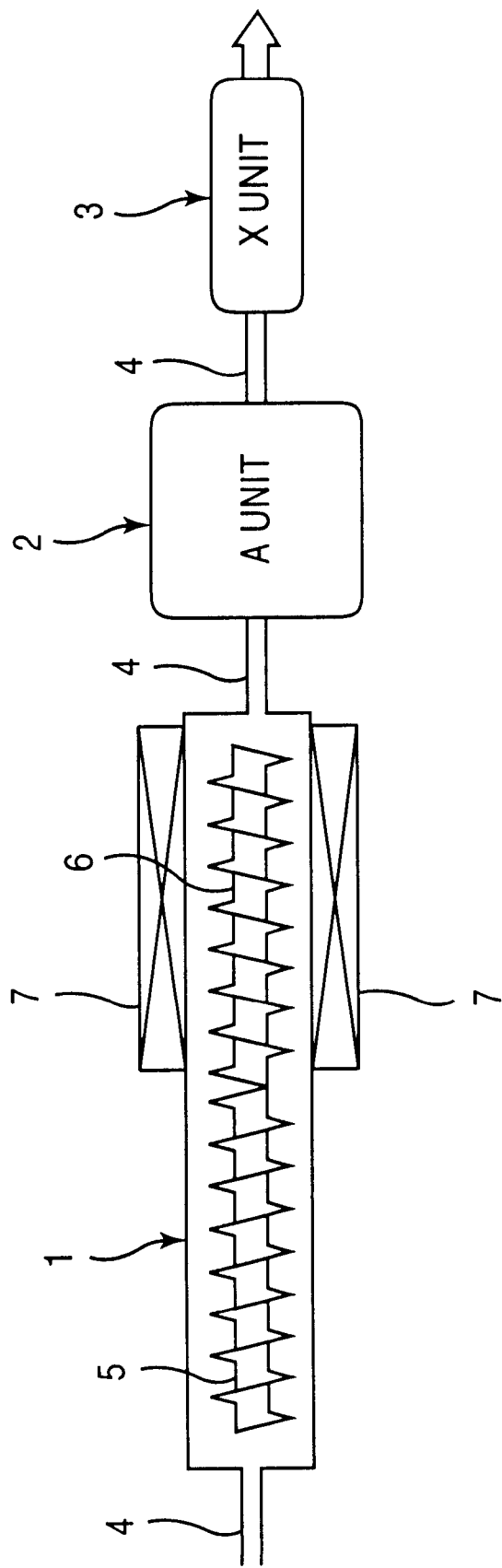
FIG. 1 is a process explanatory drawing of one example of the industrial production process of the method of producing fat and oil composition of the present invention.

The present invention will now be explained in further detail by giving examples and comparative examples, but the present invention is in no way limited to these examples. Furthermore, unless otherwise noted, the "%" in the following entry is always "wt %."

(Example 1)

A mixed oil of 50% hard palm oil, 20% lard, and 30% pure corn oil (melting point of 34.1° C.; solid fat content at 5° C. by standard methods=75.2%) was melted at 65° C. and then introduced to a hydrostatic vessel (capacity of approximately 50 cc). Then samples that had been crystallized in a hydrostatic medium (50% ethanol) that had been cooled to 5° C. by pressurization to 10 MPa, 50 MPa, 100 MPa and 150 MPa at a pressurization time of 10 minutes, 20 minutes, 40 minutes and 60 minutes, respectively, were prepared and the solid fat content of the samples (No. 1 through 16) immediately after this treatment was determined. Furthermore, the solid fat content was determined using the Solid Fat Content Analyzer made by Praxis Corporation (USA) (Praxis SFC Analyzer Model SFC-900A/486) with olive oil as the control sample.

(Comparative Example 1)

Mixed oil of the same ingredients as in Example 1 was melted at 65° C. and introduced to the same hydrostatic vessel. Then samples that had been crystallized by being kept in the hydrostatic medium (50% ethanol) cooled to 5° C. without pressurization for 10 minutes, 20 minutes, 40 minutes, and 60 minutes were prepared and the solid fat content of the samples (No. 17 through 20) immediately after treatment was determined by the same method as in Example 1.

The results of determining the solid fat content and percentage crystallization of each sample obtained in Example 1 and Comparative Example 1 are shown in Table 1. Furthermore, the crystallization percentage here is the he solid weight content at 5° C. by standard d method of determining solid fat content of hod CD-81) of the mixed oil that was used.

TABLE 1

Example 1 (samples No. 1 ~ 16),
Comparative Example 1 (sample No. 17 ~ 20)

| | Sample No. | Pressure (MPa) | Time (minutes) | Solid fat content (%) | Crystallization percentage (%) |
|---|---|---|---|---|---|
| Example 1 | 1 | 10 | 10 | 57.5 | 76.5 |
| | 2 | 10 | 20 | 67.5 | 89.8 |
| | 3 | 10 | 40 | 73.8 | 98.1 |
| | 4 | 10 | 60 | 74.6 | 99.2 |
| | 5 | 50 | 10 | 61.8 | 82.2 |
| | 6 | 50 | 20 | 69.8 | 92.8 |
| | 7 | 50 | 40 | 74.6 | 99.2 |
| | 8 | 50 | 60 | 74.9 | 99.6 |
| | 9 | 100 | 10 | 65.1 | 86.6 |
| | 10 | 100 | 20 | 71.8 | 95.5 |
| | 11 | 100 | 40 | 74.5 | 99.1 |
| | 12 | 100 | 60 | 74.9 | 99.6 |
| | 13 | 150 | 10 | 66.3 | 88.2 |
| | 14 | 150 | 20 | 72.5 | 96.4 |
| | 15 | 150 | 40 | 74.8 | 99.5 |
| Comparative Example 1 | 17 | Normal pressure | 10 | 26.3 | 35.0 |
| | 18 | Normal pressure | 20 | 54.1 | 71.9 |
| | 19 | Normal pressure | 40 | 64.1 | 85.2 |
| | 20 | Normal pressure | 60 | 66.3 | 88.2 |

As is clear from the results in Table 1, by performing crystallization in accordance with the present invention by pressurization at a pressure of 10 MPa or higher, crystallization of the fat and oil is markedly promoted and when compared to the case where crystallization is performed at normal pressure, crystallization is completed within a short amount of time. Moreover, any further crystallization-promoting activity gradually becomes smaller at a high pressure of 50 MPa or higher and it appears that there is almost no effect when pressure is further increased to above 150 MPa.

Figure 4:
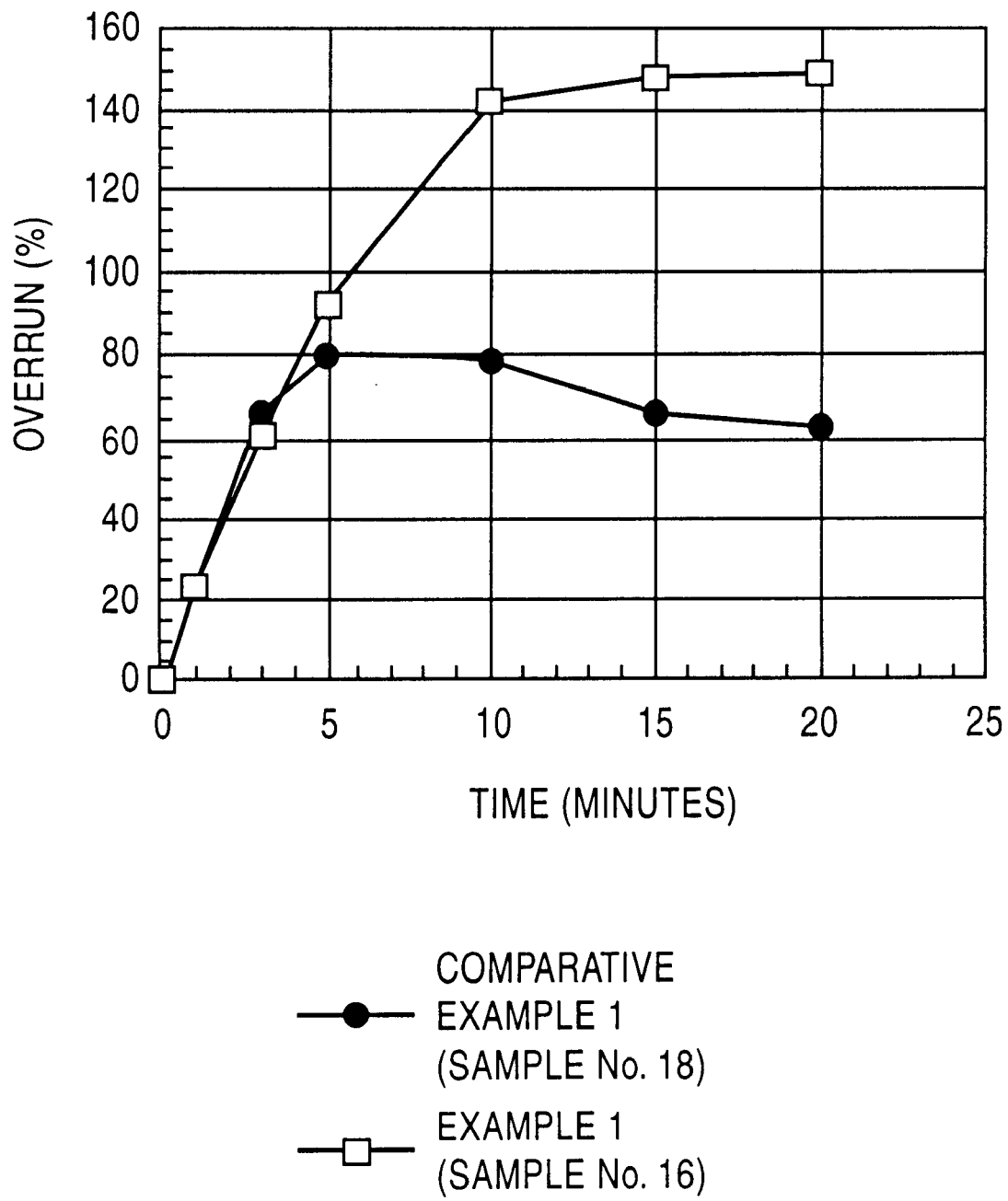
FIG. 4 is a graph showing the creaming curve of the fat and oil compositions of Example 1 and Comparative Example 1.

Moreover, of the samples obtained in Example 1, 300 g each of sample (No. 6) that had been treated at a pressure of 50 MPa for a pressurization time of 20 minutes and of sample No. 18 obtained in Comparative Example 1 that had been treated for 20 minutes without performing pressurization were kept overnight in a refrigerator (5° C.) and then temperature was brought to 25° C. for a 3-hour period and whipping tests were performed at 25° C. with a Hobart mixer using a wire whipper. Air content was compared by the overrun (%). The term overrun used here is the number represented by (A–x)/x×100 (A: capacity of scale pan× specific gravity of sample, x=sample weight). The results are shown in FIG. 4. Sample No. 18 (Comparative Example 1) that had not been pressurized began to become flat in 10 minutes and thereafter gave off gas, while sample No. 6 (Example 1) that had been pressurized at 50 MPa continued to show an increase in its overrun value for 20 minutes without becoming flat.

Furthermore, each physical property of texture, gloss, firmness, and spreadability (ease of spreading) when sample No. 6 (treatment pressure of 50 MPa and pressurization time of 20 minutes) that was obtained in Example 1 and sample No. 18 (treated for 20 minutes without being pressurized) obtained in Comparative Example 1 as previously described were stored in a refrigerator (5° C.) overnight and then brought to 25° C. for a 3-hour-period were compared by organoleptic tests by a 10-member panel at 25° C. The results are shown in Table 2.

TABLE 2

Examples 1 (Sample No. 6),
Comparative example 1 (sample No. 18)

| | Pressure (MPa) | Texture | Gloss | Firmness | Spreadability |
|---|---|---|---|---|---|
| Example 1 | 50 | 4.2 | 3.8 | 4.6 | 3.6 |
| Comparative Example 2 | Normal pressure | 2.6 | 2.3 | 2.1 | 1.8 |

The ratings in the table show the average rating out of a possible of 5 points from the 10-member panel.

As is clear from Table 2, the evaluation of texture, gloss, firmness and spreadability (ease of spreading) of sample No. 6 (Example 1) that had been pressurized were all superior to sample No. 18 (Comparative Example 1) that had not been pressurized within a range of significant difference.

(Examples 2 through 4)

A mixed oil with the same composition as in Example 1 was used as the sample. This sample was melted at 65° C. and then introduced to the same type of hydrostatic vessel. Then temperature changes in the center of samples (No. 21 through 24) were monitored with a sensor as the samples were pressurized in a hydrostatic medium (50% ethanol) that had been cooled to 5° C. to 10 MPa, 50 MPa, 100 MPa and 150 MPa for 20 minutes (Example 2). Moreover, the same treatment was performed with the exception that the mixed oil was changed to cocoa butter (Example 3, Samples No. 25 through 28) and pure palm oil (Example 4, samples No. 29 through 32).

(Comparative Examples 2 through 4)

Other than the fact that there was no pressurization, the same fats and oils were treated under the same treatment conditions as in Examples 2 through 4 and the changes in temperature in the center of the samples (No. 33 through 35) were monitored with a sensor.

Figure 5:
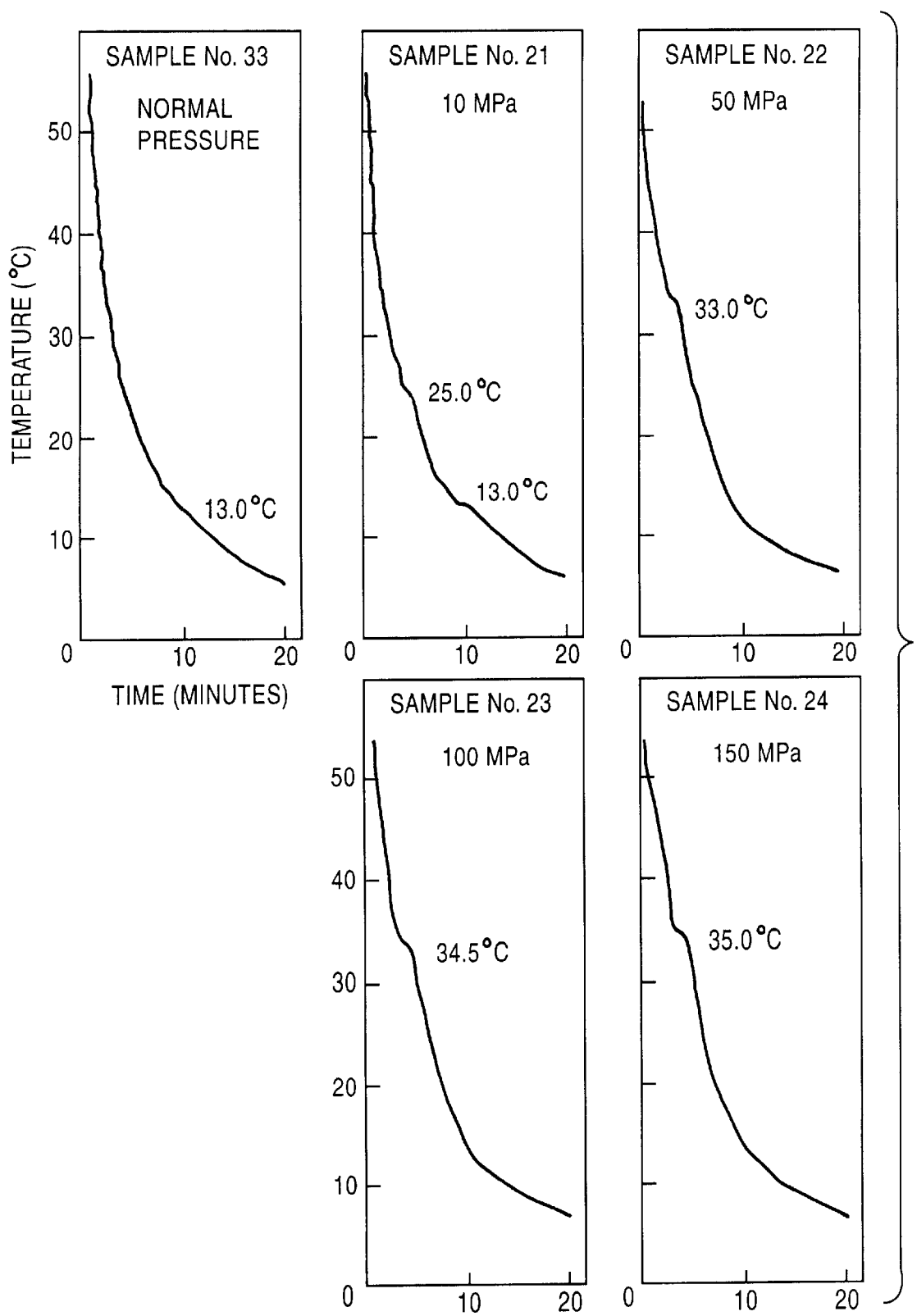
FIG. 5 is a graph showing the cooling curve of each mixed oil under various pressurization conditions of Example 2 (samples No. 21 through 24) and Comparative Example 2 (sample No. 33).
Figure 6:
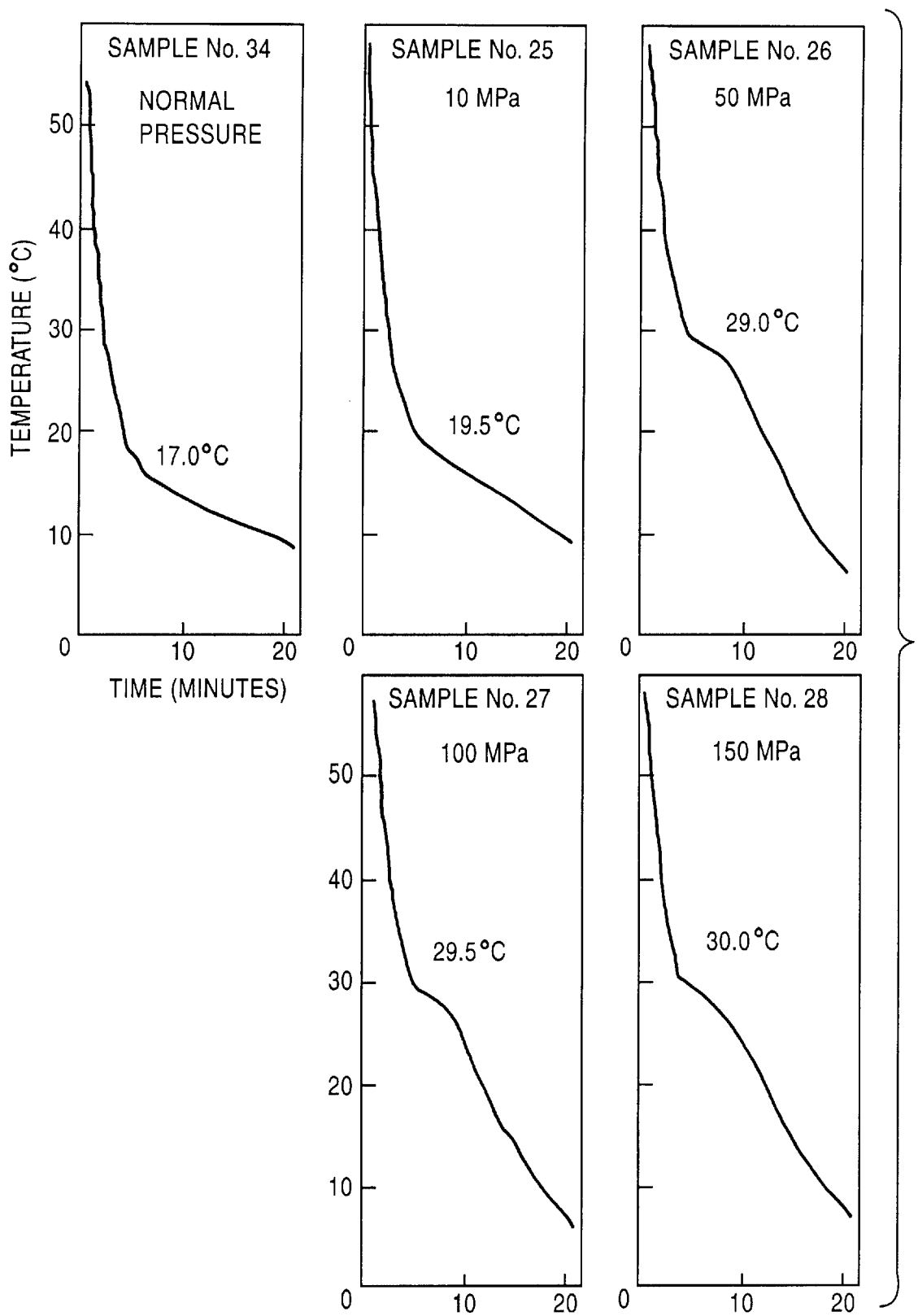
FIG. 6 is a graph showing the cooling curve of each cocoa butter of Example 3 (samples No. 25 through 28) and Comparative Example 3 (sample No. 34).
Figure 7:
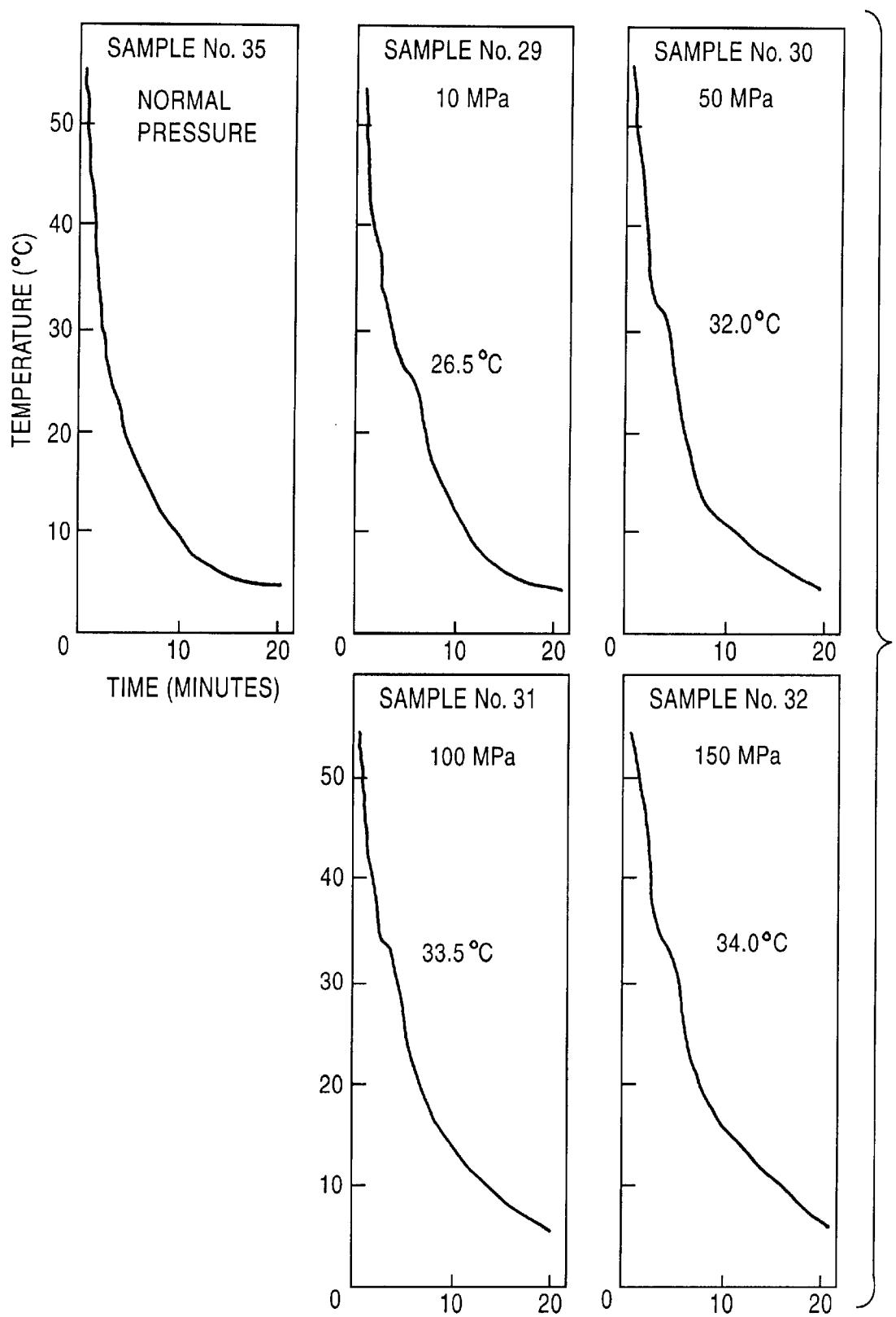
FIG. 7 is a graph showing the cooling curve under various pressure conditions of each pure palm oil of Example 4 (samples No. 29 through 32) and Comparative Example 4 (sample No. 35).

The results of Examples 2 through 4 and Comparative Examples 2 through 4 (cooling curve) are shown in FIGS. 5 through 7. There is a reduction in temperature with time and a peak or inflection point is seen at a certain temperature in FIGS. 5 through 7. This appears to be due to a phase change, that is, the heat of crystallization as a result of crystallization of the sample. As is clear from FIGS. 5 and 7, the inflection point of temperature, that is, the crystallization starting temperature, rises with an increase in pressure and crystallization of fats and oils comprising various solid fats is promoted. Moreover, although the purified palm oil in FIG. 7 did not thoroughly crystallize in 20 minutes at normal pressure and remained fluid, crystallization proceeded when pressurized by force at 10 MPa or more and fat and oil crystals with shape retention were obtained. Therefore, it is clear that the crystallization-promoting activity of pressurization is effective.

(Example 5)

Figure 2:
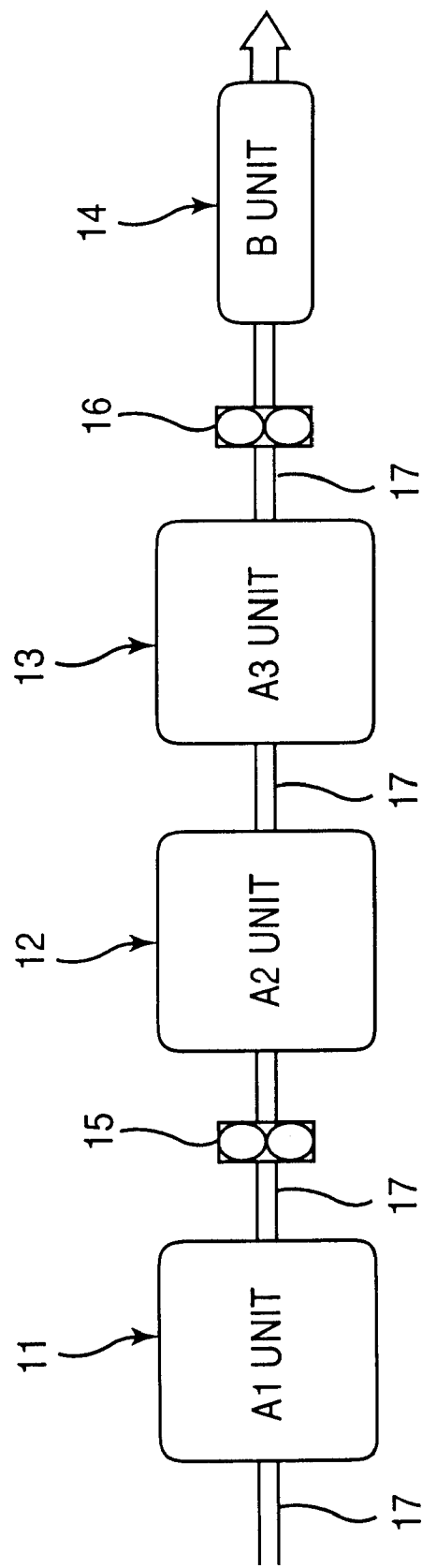
FIG. 2 is a process explanatory drawing showing another example of the industrial production process of the method of producing fat and oil composition of the present invention.

Using a W/O emulsion consisting of 80% mixed oil of 50% hard palm oil, 20% lard, and 30% pure corn oil (melting point of 34.1° C.), 0.2% glycerin monofatty acid ester (Emaruji MS, Riken Vitamin Co., Ltd.), 0.2% lecithin, and 19.6% water, margarine was produced with the system shown in FIG. 2 under the various operating conditions in Table 3 while controlling pressure of A2 unit 12 and A3 unit 13 to 30 MPa with gear pumps 15 and 16. The margarine that was obtained was stored in a refrigerator (5° C.) overnight and then each fat and oil property of texture, gloss, firmness, and spreadability (ease of spreading) were evaluated by organoleptic tests by a 10-member panel using the same evaluation method as in Table 2.

(Comparative Example 5)

Using the same emulsion as in Example 5, margarine was produced with the same system under the various operating conditions in Table 3 in accordance with conventional methods without any particular adjustment of pressure by the gear pumps. As in Example 5, the margarine that was obtained was stored overnight in a refrigerator (5° C.) and then the various fat and oil properties of texture, gloss, firmness, and spreadability (ease of spreading) were evaluated by a 10-member panel with the same evaluation method as in Table 2.

The results of organoleptic evaluation of above-mentioned Example 5 and Comparative Example 5 are shown in Table 4.

TABLE 4

| | Examples 5, Comparative example 5 | | | | |
|---|---|---|---|---|---|
| | Pressure (MPa) | Texture | Gloss | Firmness | Spreadability |
| Example 5 | 30 | 4.6 | 4.4 | 4.5 | 4.5 |
| Comparative Example 5 | Normal pressure | 3.5 | 3.3 | 3.4 | 2.8 |

The ratings in the table show the average rating out of a possible of 5 points from the 10-member panel.

(Example 6)

Figure 3:
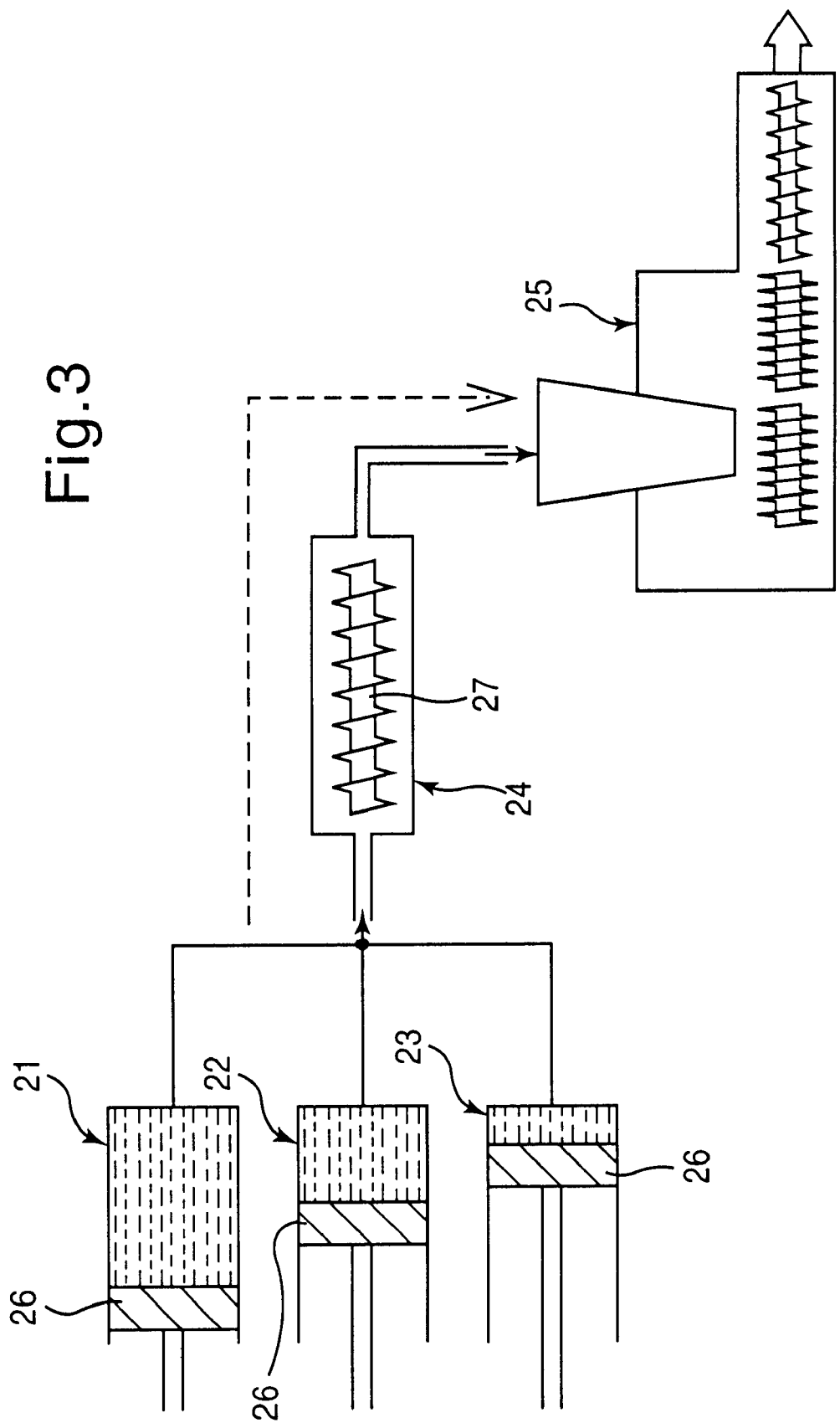
FIG. 3 is a process explanatory drawing showing yet another example of the industrial production process of the method of producing fat and oil composition of the present invention.

Margarine was produced by the system shown in FIG. 3 using the same emulsion as in Example 5 by going through a kneading process after crystallization for 30 minutes at a pressure of 30 MPa and a cooling medium temperature of −15° C. in crystallization units 21 through 23. After storing the margarine that was obtained in a refrigerator (5° C.) overnight, each fat and oil property of texture, gloss, firmness, and spreadability (ease of spreading) was evaluated by organoleptic tests by a 10-member panel using the same evaluation methods as in Table 2.

(Comparative Example 6)

Using the same emulsion as in Example 6, margarine was produced with the same system as in Example 6 without any particular adjustment of pressure by the gear pumps. The margarine that was obtained was stored overnight in a refrigerator (5° C.) and then the various fat and oil properties of texture, gloss, firmness, and spreadability (ease of spreading) were evaluated by a 10-member panel using the same evaluation method as in Table 2.

The results of the organoleptic tests in above-mentioned Example 6 and Comparative Example 6 are shown in Table 5.

TABLE 5

| | Examples 6, Comparative example 6 | | | | |
|---|---|---|---|---|---|
| | Pressure (MPa) | Texture | Gloss | Firmness | Spreadability |
| Example 6 | 30 | 4.2 | 4.1 | 4.5 | 4.1 |
| Comparative Example 6 | Normal pressure | 2.8 | 2.9 | 3.0 | 2.5 |

The ratings in the table show the average rating out of a possible of 5 points from the 10-member panel.

As is clear from Tables 4 and 5, the margarines of Examples 5 and 6 that were produced by crystallization

TABLE 3

| | Operating conditions | | | | | |
|---|---|---|---|---|---|---|
| | A1 unit inlet temperature | A1 unit outlet temperature | A2 unit outlet temperature | A3 unit outlet temperature | B unit outlet temperature | A2 unit outlet pressure |
| Example 5 | 58° C. | 28° C. | 30° C. | 20° C. | 21° C. | 30 MPa |
| Comparative Example 5 | 59° C. | 29° C. | 20° C. | 17° C. | 24° C. | 2.5 MPa | accompanied by pressurization had excellent ratings in terms of texture, gloss, firmness, and spreadability (ease of spreading) when compared to the margarines in Comparative Examples 5 and 6 that were produced by crystallization without pressurization. Moreover, although in Example 5 the margarine was cooled by the A2 unit, the A2 outlet temperature rose somewhat under the operating conditions in Table 3. However, this was because heat of crystallization was generated and this rise in outlet temperature therefore indicates that crystallization occurs all at once in the A2 unit.

(Example 7)

Figure 8:
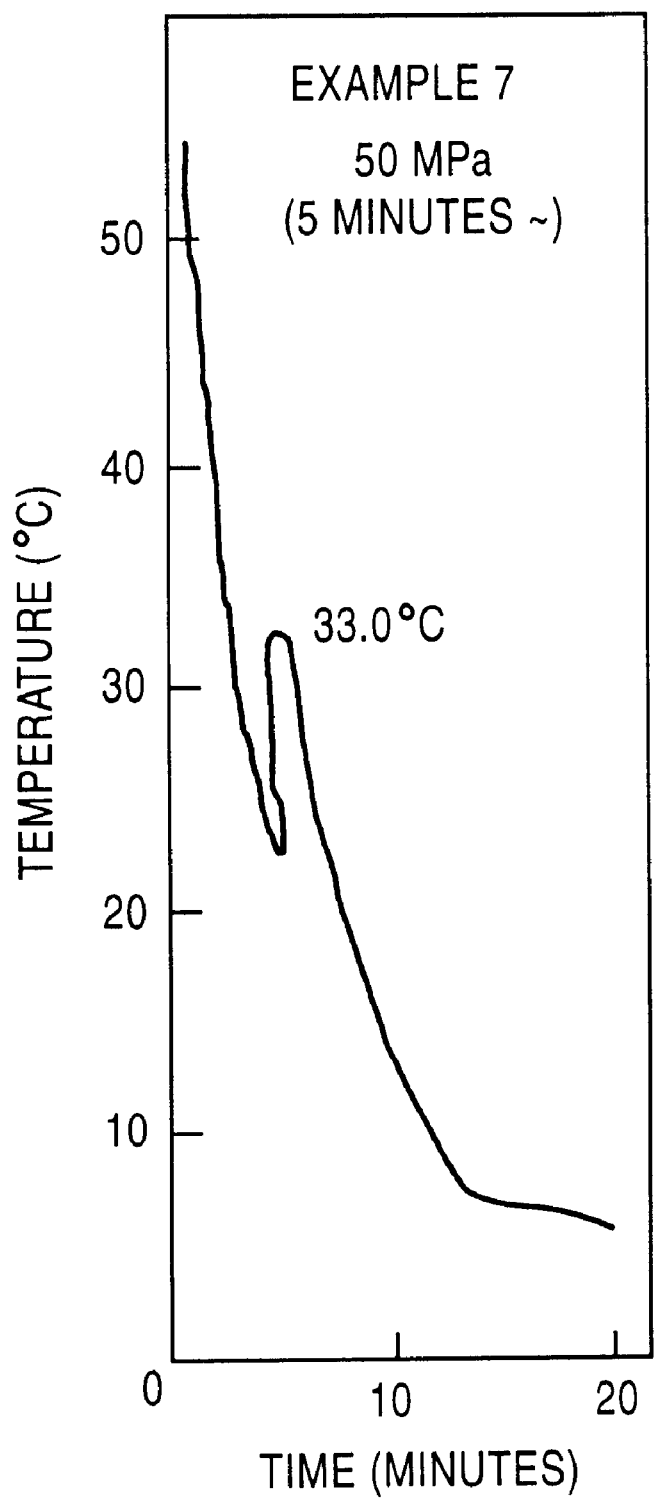
FIG. 8 is a graph showing the cooling curve of mixed oil under conditions of pressurization to 50 MPa after pre-cooling (Example 7).

A mixed oil with the same ingredients as in Example 1 was melted at 65° C. and introduced to the same hydrostatic vessel. Then it was cooled in a hydrostatic medium (50% ethanol) that had been cooled to 5° C. and it was pressurized to 50 MPa 2 minutes later, when the temperature in the center of the sample had reached 23.5° C. Further changes in temperature in the center of the sample were monitored with a sensor while pressurization was continued for 15 minutes. The cooling curve of the sample at this time is shown in FIG. 8. When the cooling curve in FIG. 8 is compared with that treated at normal pressure (sample No. 33) and that pressurized at 50 MPa (sample No. 24) shown in FIG. 5, temperature of the sample rose to the crystallization starting temperature (33° C.) at 50 MPa immediately after pressurization by the pressurization method of the present example, indicating that crystallization occurs all at once. Moreover, because an inflection point is seen at approximately 13 minutes, it is concluded with respect to the crystallization completion time that crystallization is efficiently completed with the standard pressurization time.

By means of the present invention, it has been possible to dramatically improve the crystallization speed and thereby prevent post-crystallization, which was impossible in the past, by adding pressurization simultaneous with cooling to crystallize the fat and oil composition, which by conventional methods is accomplished by cooling only. As a result, improvement of quality of the fat and oil processed food and marked improvement in efficiency of the production process in terms of both time and energy can be expected. Thus, the present invention is a long awaited, very effective as means for solving the various problems of fat and oil processed foods and is particularly valuable for producing fat and oil processed foods.

What is claimed is:

1. A method of producing a fat and oil composition comprising the steps of:
   melting a fat and oil or emulsion comprising fat and oil and
   crystallizing said fat and oil by cooling under force by a cooling means to produce a fat and oil composition in paste form or plastic form,
   with said melted fat and oil or emulsion comprising fat and oil being pressurized within a range of 10 to 150 MPa under force during said cooling.

2. A method of producing a fat and oil composition according to claim 1, wherein pressurization is performed simultaneously with said cooling.

3. A method of producing a fat and oil composition according to claim 1,
   wherein pre-cooling said fat and oil or emulsion comprising fat and oil is performed to such an extent that crystals of the fat and oil do not precipitate, then pressurization is started with continued cooling.

4. A method of producing a fat and oil composition according to any of claims 1 through 3,
   wherein the pressurization pressure is within a range of 10 to 100 MPa.

5. A method of producing a fat and oil composition according to any of claims 1 through 3, wherein pressurization time is within a range of 1 to 60 minutes.

6. A method of producing a fat and oil composition according to any of claims 1 through 3, wherein kneading is performed during said crystallization.

7. A method of producing a fat and oil composition according to any of claims 1 through 3, wherein kneading is performed after said crystallization.

8. A method of producing a fat and oil composition according to any of claims 1 through 3, wherein said emulsion is a W/O emulsion.

9. A method of producing a fat and oil composition in any of claims 1 through 3, wherein said fat and oil is an edible fat and oil.

* * * * *